United States Patent
Varone

(10) Patent No.: US 10,133,923 B2
(45) Date of Patent: Nov. 20, 2018

(54) IC CARD FOR AUTHENTICATION AND A METHOD FOR AUTHENTICATING THE IC CARD

(71) Applicant: STMICROELECTRONICS S.R.L, Agrate Brianza (MB) (IT)

(72) Inventor: Francesco Varone, Bellona (IT)

(73) Assignee: STMICROELECTRONICS SRL., Agrate Brianza (MB) (IT)

( * ) Notice: Subject to any disclaimer, the term of this patent is extended or adjusted under 35 U.S.C. 154(b) by 232 days.

(21) Appl. No.: 13/867,214

(22) Filed: Apr. 22, 2013

(65) Prior Publication Data
US 2013/0287267 A1    Oct. 31, 2013

(30) Foreign Application Priority Data
Apr. 27, 2012 (IT) .............................. MI2012A0706

(51) Int. Cl.
| | |
|---|---|
| G06K 9/00 | (2006.01) |
| G06K 19/18 | (2006.01) |
| G06K 19/08 | (2006.01) |
| G06K 19/14 | (2006.01) |

(52) U.S. Cl.
CPC ....... *G06K 9/00577* (2013.01); *G06K 19/086* (2013.01); *G06K 19/145* (2013.01); *G06K 19/18* (2013.01)

(58) Field of Classification Search
CPC ............. G06Q 20/409; G06K 9/00577; G06K 19/145; G06K 19/086; G06K 19/18; G06K 19/10
USPC .................................. 235/435–495; 382/181
See application file for complete search history.

(56) References Cited

U.S. PATENT DOCUMENTS

| | | | | |
|---|---|---|---|---|
| 4,218,674 | A | * 8/1980 | Brosow et al. | ............... 340/5.86 |
| 5,521,984 | A | * 5/1996 | Denenberg et al. | .......... 382/209 |
| 6,199,761 | B1 | * 3/2001 | Drexler | ......................... 235/487 |
| 6,412,701 | B1 | * 7/2002 | Kohama | ............. G06K 19/027 235/488 |
| 7,793,837 | B1 | * 9/2010 | Faith | .................... G06K 19/083 235/375 |
| 2004/0207891 | A1 | 10/2004 | Suzuki | |
| 2005/0182729 | A1 | * 8/2005 | Kananen | ......................... 705/57 |
| 2005/0216350 | A1 | * 9/2005 | Aibazov | ............... B42D 25/20 705/19 |

(Continued)

FOREIGN PATENT DOCUMENTS

| | | | |
|---|---|---|---|
| CN | 101882232 A | * | 11/2010 |
| GB | 2 471 999 | | 1/2011 |
| WO | 2004/044636 | | 5/2004 |
| WO | 2007133163 | | 11/2007 |

OTHER PUBLICATIONS

Schneier, Bruce, and Adam Shostack. "Breaking up is hard to do: modeling security threats for smart cards." USENIX Workshop on Smart Card Technology, Chicago, Illinois, USA. 1999.*

(Continued)

*Primary Examiner* — Geoffrey E Summers
(74) *Attorney, Agent, or Firm* — Slater Matsil, LLP

(57) ABSTRACT

An IC card includes a first visible layer including a natural material having a unique visual pattern. A storage device is configured to store a digital reference image of the unique visual pattern to be visually compared with the unique visual pattern for authentication. An authentication method based on the IC card is also provided.

23 Claims, 6 Drawing Sheets

(56) References Cited

U.S. PATENT DOCUMENTS

| | | | | |
|---|---|---|---|---|
| 2005/0262350 | A1* | 11/2005 | Boutant et al. | 713/176 |
| 2007/0118822 | A1* | 5/2007 | Ito et al. | 716/1 |
| 2008/0144947 | A1* | 6/2008 | Alasia et al. | 382/232 |
| 2008/0245865 | A1* | 10/2008 | Mosteller | B42D 25/00 235/449 |
| 2009/0039154 | A1* | 2/2009 | Williams | G06K 19/04 235/380 |
| 2009/0155456 | A1* | 6/2009 | Benkley | G06K 9/00013 427/64 |
| 2009/0181215 | A1* | 7/2009 | Keim | B29C 45/14467 428/161 |
| 2009/0294543 | A1* | 12/2009 | Varga et al. | 235/492 |
| 2011/0168781 | A1* | 7/2011 | Akesson | B32B 5/26 235/492 |
| 2012/0243797 | A1* | 9/2012 | Di Venuto Dayer et al. | 382/218 |

OTHER PUBLICATIONS

International Civil Aviation Organization. Doc 9303. Machine Readable Travel Documents—Part 1: Machine Readable Passports. vols. 1 and 2. Sixth Edition. 2006.*

O'Gorman, Lawrence, and Irina Rabinovich. "Photo-image authentication by pattern recognition and cryptography." Pattern Recognition, 1996., Proceedings of the 13th International Conference on. vol. 3. IEEE, 1996.*

"TXTR-LITE Flexible Real Stone Veneer; a Revolution in Stone Surfaces." PRWeb, Jun. 19, 2011. Web. Accessed Dec. 8, 2017.*

"Eurosmart White pater Smart Biometrics for Trust and Convenience" http://www.eurosmart.com/images/doc/Papers/eurosmart_whitepaper_biometrics_final.pdf: Dec. 2010: 75 pgs.

\* cited by examiner

IC CARD FOR AUTHENTICATION AND A METHOD FOR AUTHENTICATING THE IC CARD

FIELD OF THE INVENTION

The present invention relates to an IC card for authentication, and to a method for authenticating the IC card. More particularly, a natural material is associated with the IC card for authentication.

The IC card involves a biometric feature originated by a natural material or by an artificial element, and the following description is made with reference to this application field for explanation purposes.

BACKGROUND OF THE INVENTION

A natural material can be associated with an IC card for authentication and identification. In this respect, a publication titled "Smart Biometrics for Trust and Convenience," Eurosmart, December 2010, discloses biometrics for authenticating and securely identifying, while taking in consideration several aspects, such as electronic ID, access passes, payment, and information such as emails and database records, and important paper documents, for example.

The above publication further mentions inanimate objects and even artificial objects among entities in which biometrics can be applied. Any "natural phenomenon for elements whose characteristics are chaotic and measurable" is defined as a biometric object. According to other sources, natural phenomena not related to a biological material may have different designations, e.g., physical unduplicated features (cfr. IEEE 10.1109/ICASSP.2011. 5946831).

A product, known as Prooftag™, uses air bubbles for authentication. This product overcomes the drawbacks of prior art authentication methods by using randomly generated air bubbles for authentication, which is unique in its form factors. Prior art authentication methods are based on mass-produced, and consequently, mass-reproducible methods.

However, Prooftag™ itself has several drawbacks. During the phase of authentication, each bubble tag is associated with a unique identifier stored in a database of a system operator. An Internet connection to such a database is required for any authentication, and the authentication cannot be executed if the connection is not available.

Another drawback of Prooftag™ is that it is configured to be attached to a product or to an IC card, and the attached tag can be detached during the delivery of the product, i.e., before the authentication of the product. In fact, the detached tag can be associated with another product if the consumer buying the first product did not perform or complete the authentication process. Moreover, a tag attached to an IC card makes the surface of the IC card non-planar and protruding with respect to the surface.

SUMMARY OF THE INVENTION

An object of the present invention is to provide an IC card and a method for authenticating the IC card with a remote connection not being required for an authentication, and with a natural material or artificial object being used to identify the IC card where no protrusion or detachable problems arise. This allows for a counterfeit resistant card product, and overcomes the drawbacks that currently affect the prior art methods and IC cards of this kind.

This and other objects, features and advantages are provided by coupling an IC card to a sample of a biometric object or natural material having a graphical layout or appearance that is visually distinguishable with respect to other samples, even with respect to a sample of the same biometric object or natural material. This is due to the unique pattern of each sample. In this manner, the sample of the biometric object or natural material is inlaid or embedded within a card layer or surface and cannot be detached from the IC card. A digital image of the sample is stored in the IC card chip at production.

When the IC card is exhibited, the digital image may be read or picked-up from the chip through an IC card reader and then displayed so that the unique pattern of the digital image may be compared to the unique pattern of the sample coupled or associated with the IC card surface for a visual comparison and authentication. Advantageously, the IC card cannot be duplicated starting from another sample of the same natural material or from samples of different materials.

The IC card may comprise at least a first visible layer reporting or providing a natural material or a biometric element, and a memory portion storing inside the IC card a reference image of the first visible layer to be visually compared with the first visible layer for authentication.

In other words, the IC card may comprise a first visible layer including a natural material, and a memory to store a digital reference image of the first layer. The digital reference image may be visually compared with the first layer for authentication.

In all of the possible embodiments for a visible layer, such a visible layer may include any surface that may be seen or detected by a natural eye or an image detector.

The natural material of the first visible layer may be selected from a group including wood or leather or stone or any natural material showing or defining a pattern or vein which may be visually compared with a pattern or vein displayed with the digital reference image. The display may be through a reader device of the IC card, for instance.

The term visual comparison includes an automatic comparing system based on an image detector or an equivalent detection.

A second protective layer may be provided on a surface of the first visible layer, for example, a plastic covering layer. A transparent layer may be further arranged on a counter disposed surface of the first layer for further protection. The transparent layer may allow inspection of the natural material within the first visible layer.

The IC card may further comprise a third layer arranged on a portion of the second layer or transparent layer, including a picture of the first visible layer. For example, the picture may be a downscaled image of a partial or an entire surface of the first visible layer, and is advantageously used for comparison with the first visual layer and/or with the digital reference image displayed on the IC card reader.

The picture in the third layer may be monochrome and include veining of the first visible layer. This allows the user to focus on some specific patterns of the natural material, corresponding to the grayscale or monochrome, for a better comparison.

Storing of the digital reference image may be done by an IC chip, a bar code, a 2D code, a magnetic band or an optical band. The digital reference image may be encrypted by an IC card issuer from the image of the first visible layer and stored in an encrypted format. Advantageously, the encryption of the reference image may be associated with the pattern considered as unique identification information of the IC card, since no samples with identical patterns are available.

The digital reference image may be digitally signed by an IC card issuer from the image of the first visible layer, and stored in an encrypted format in the IC card.

Another aspect is directed to a method for authenticating an IC card through an authentication apparatus, where the IC card may include a first visible layer comprising a natural material, and a memory for storing a digital reference image of the first visible layer. The method may comprise the steps of reading the digital reference image with the authentication apparatus, scanning the first visible layer, comparing the digital reference image with the scanned image of the first visible layer, and authenticating the IC card if the scanned image is substantially identical to the digital reference image.

Again, a visible layer is intended to include any surface that may be seen or detected by a natural eye or an image detector. The term visual comparison is intended to include an automatic comparing system based on an image detector or an equivalent detection.

The digital reference image may be displayed on the display device of the authentication apparatus for visual authentication.

The method may comprise retrieving the reference image, scanning the first layer into a sample image, comparing the retrieved reference image with the sample image, and authenticating the identity of the card if the sample image is determined to be substantially identical to the retrieved reference image.

The method may further comprise storing the reference image in the memory portion of the authentication apparatus after encrypting the reference image with a first key of the card issuer. The step of retrieving the reference image may comprise decrypting the reference image stored with a second key, and the second key may be associated with the first key.

BRIEF DESCRIPTION OF THE DRAWINGS

Further advantages and features of the method, the device, and the media storage according to the present invention will be apparent from the description given below for explanation purposes and without limiting the scope of protection.

DETAILED DESCRIPTION OF THE PREFERRED EMBODIMENTS

The accompanying drawings, which are included to provide a further understanding of the disclosure and are incorporated in and constitute part of this application, illustrate different embodiments of the disclosure and together with the description serve to explain the principles of the disclosure.

The method steps hereafter described do not form a complete flow of the process for the manufacturing of integrated circuits. The techniques for manufacturing the integrated circuits currently used in the field, and commonly used process steps necessary for understanding the integrated circuits are included in the description.

The figures showing transversal sections of integrated electronic device portions during the manufacturing are not drawn to scale, but are instead drawn to show important characteristics.

Figure 1A:
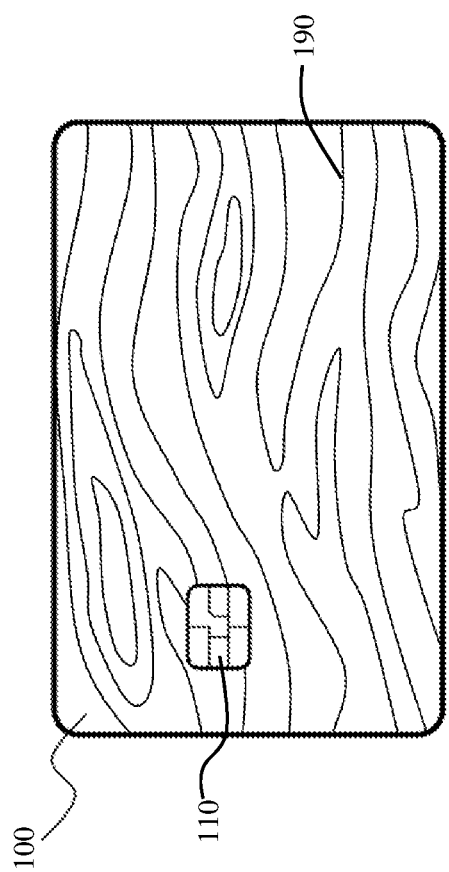
FIG. 1A schematically represents a top view of an IC card for authentication according to a first embodiment of the present invention.
Figure 1B:
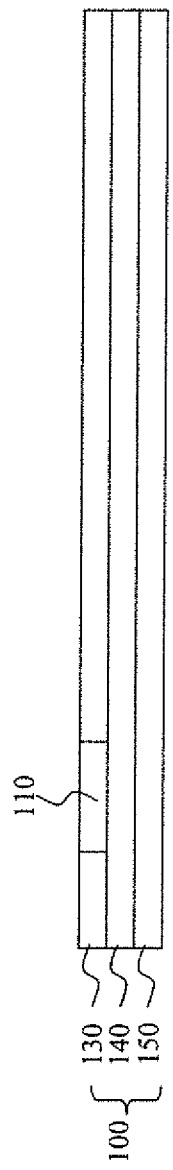
FIG. 1B schematically represents a front view of the IC card of FIG. 1A.

With reference to FIGS. 1A and 1B, a schematically represented IC card for authentication includes a natural material or a biometric element comprising a graphical pattern which is substantially impossible to reproduce artificially, even by use of the same techniques that form the basic sample of the natural material or the biometric element. In other words, the natural material and graphical pattern may be considered as a physical unclonable function or PUF, which is a function that is embodied in a physical structure and is easy to evaluate but hard to predict.

FIG. 1A is a top view of the IC card and FIG. 1B a front view. The IC card includes one or more visible layers 100 including the natural material, and a memory 110 for storing a digital reference image of the layer including the natural material. The memory 110, for instance, may be a chip, a bar code, a 2D code, a magnetic band or an optical band. The memory 110 may be a non-volatile memory portion or the same chip incorporated into the IC card including an embedded non-volatile memory portion.

For a visible layer, it is intended to include any surface that may be seen or detected by a natural eye or an image detector. This is valid for all the embodiments disclosed herein. Without limiting the scope of the present invention, the following description is given with reference to an IC card with a chip for storing the digital reference image.

The digital reference image is an image of the natural pattern of layers 100 and is used to authenticate the IC card through an authentication device or IC card reader, as explained below. The digital reference image is stored in an encrypted form in the IC card, and is read by the IC card reader and therein decrypted. The decrypted image is displayed on the IC card reader to be visually compared with the natural pattern on the top side surface of the IC card.

However, one skilled in the art may imagine a comparison based on an image detector that does not require a visible display of the decrypted image as is necessary for humans.

Referring to FIG. 1B, the layers 100 comprise at least a first layer 140, a second layer 150 and a transparent layer 130. The first layer 140 comprises the natural material selected from a group including, for instance, wood, stone or leather.

Advantageously, the natural material or biometric element is inlaid in the first layer and does not protrude from it. In other words, the natural material or biometric element is located in at least a card portion where no protrusion or detachable problems arise.

The natural material constitutes the first layer. For example, the first layer is a sheet of wood with a size substantially corresponding to a size of an IC card 7816 compliant, which is inlaid within further layers of the IC card. The second layer 150 serves as a supporting layer for the first layer 140, and the transparent layer 130 serves as a protective layer of the first layer 140. In one embodiment, the first layer 140 is a hard material and no transparent layer 130 is provided for protection.

An IC card issuer takes a picture of or scans the image of the first layer 140, and saves the scanned image in the IC chip 110 as a reference image. The image is preferably signed or encrypted by a key before being stored in the IC Chip 110.

Both a non-symmetric encryption scheme and a symmetric encryption scheme can be used. If a non-symmetric encryption scheme is used, the reference image is encrypted with a private key owned by the IC card issuer. Then, when the authentication is performed by an authentication apparatus, the reference image may be decrypted with a public key before comparing the digital reference image displayed on the authentication apparatus with the image of the first layer 140. The image of the first layer 140 is scanned by an optical device of the authentication apparatus. The public key is associated with the private key.

If a symmetric encryption scheme is used, the digital reference image is encrypted with a secret key only known to the IC card issuer and the authentication apparatus, or only known to the IC card issuer that perform authentication remotely. Then, when the authentication is performed by the authentication apparatus, the digital reference image is decrypted with the same secret key before comparing the digital reference image with the image of the first layer 140.

Since the pattern formed in the first layer is natural or naturally generated, it is almost impossible for a forger to reproduce the same pattern artificially without scanning or taking picture of the pattern of the first layer 140 and without using an artificial material. That is, the forger cannot counterfeit the same IC card unless he retains the same IC card. Moreover, even if he obtains the same IC card and gets the picture of the pattern of the first layer 140, he cannot collect information concerning the signed digital reference image which is stored in the IC card 110. Therefore, the security of the IC card is further enhanced by the IC chip and the natural pattern of the first layer.

In case wood is used as the material of the first layer, the graphical pattern may include the veining of the wood 190. In FIG. 1A, the veining is drawn as a simplified version since the veining of wood has a more complex structure. Advantageously, using natural material for manufacturing the IC card is more environmentally friendly than plastic, and thereby reduces the pollution caused by an excessive use of plastic materials.

Figure 2A:
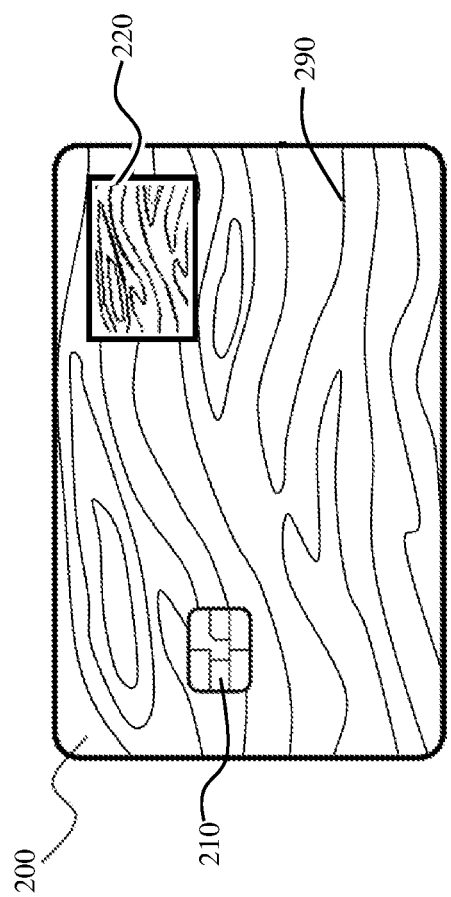
FIG. 2A schematically represents a top view of an IC card for authentication according to a second embodiment of the present invention.
Figure 2B:
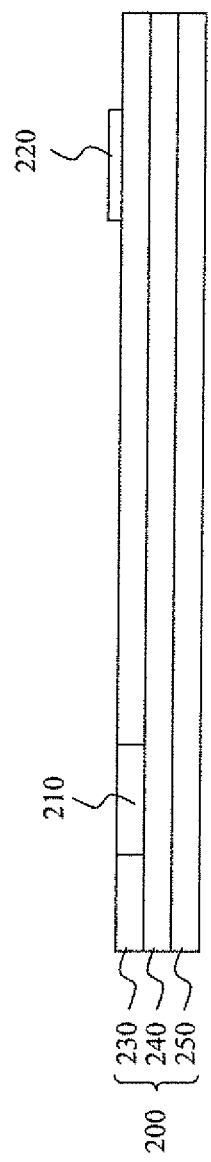
FIG. 2B schematically represents a front view of the IC card of FIG. 2A.

FIG. 2A schematically shows the top view of the IC card for authentication according to another embodiment, and FIG. 2B schematically shows the corresponding side view. The IC card comprises layers 200 including a visible layer including a natural or naturally generated pattern. The IC card further comprises a memory 210 for storing a digital reference image, for instance, an IC chip, a bar code, a 2D code, a magnetic band, or an optical band. The IC chip 210 stores the digital reference image corresponding to the graphical pattern of visible layer. The digital reference image is used to authenticate the IC card by an authentication device. More particularly, the digital reference image is stored in an encrypted form in the IC card and is read and decoded by an IC card reader, to be decrypted and compared with the image or pattern of the visible layer.

Referring to FIG. 2B, the layers 200 may comprise a first visible layer 240, a second layer 250 and a transparent layer 230. The IC chip 210 may be inserted in the transparent layer 230 or in another layer. The first visible layer 240 comprises, as in the previous embodiment, a natural material such as wood, stone, leather, etc., having a pattern which cannot be reproduced artificially and which can advantageously be used to univocally identify the IC card. The second layer 250 servers as a supporting layer for the first layer 240, and is preferably made of a material protecting the first visible layer 240 placed therein.

The transparent layer 230 serves as a protective layer of the first visible layer 240. The IC card comprises a third layer 220 arranged on a portion of the transparent layer 230 and includes a picture of the first layer. Particularly, the third layer 220 may have a downscaled image of a partial or an entire surface of the first layer 240. The ratio for the scale is predetermined and known only to the IC card issuer and the authenticate apparatus.

In this respect, the scale ratio is used as a further security measure, since a forger needs to discover the exact scale ratio to counterfeit the IC card. In a similar way, coordinates of an area of the first layer 240 in which the picture is taken are used as further security measure. That is, the coordinate of the area of the first layer 240 is not known to anyone except the IC card issuer and the authenticating apparatus.

A user can easily check the IC card by comparing the pattern of the first visual layer with the pattern of the picture of the third layer 220. The authenticating apparatus further compares the picture of the third layer 220 with the pattern of the first visual layer 240.

Preferably, the IC card issuer takes a picture or a scanned image of the first visible layer 240 and saves the image into the IC chip 210 as a digital reference image. The image is preferably signed or encrypted before being stored in the IC chip 210. Also in this embodiment, both a non-symmetric encryption scheme and a symmetric encryption scheme can be used.

Since the pattern in the first visual layer is naturally generated or made by a biometric element, it is almost impossible for the forger to reproduce the same pattern artificially without scanning or taking picture of the pattern of the first layer 240, and without using an artificial material. Thus, the forger cannot counterfeit the same IC card unless he retains the IC card. Even if he has the same IC card in his hands and gets the picture of the pattern of the first layer 240, he cannot retrieve information concerning the signed reference image stored in the IC card 210. Therefore, the security of the IC card is further enhanced by the IC chip and the natural pattern of the first visual layer.

Also in this embodiment, wood may be used as natural material of the first visible layer and the veining of the wood 290 forms the unique pattern.

Figure 3A:
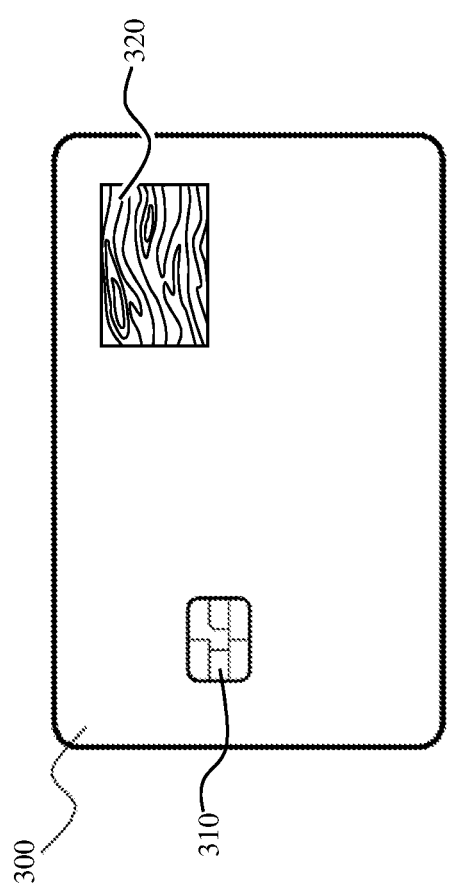
FIG. 3A schematically shows a top view of an IC card for authentication according to a third embodiment of the present invention.
Figure 3B:
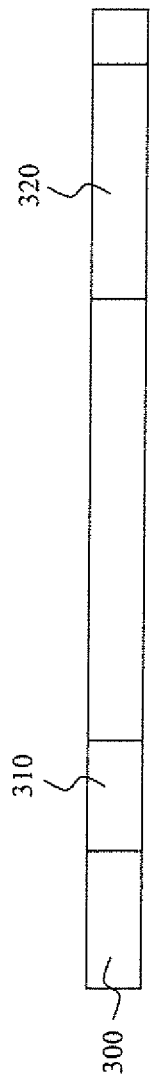
FIG. 3B schematically represents a front view of the IC card of FIG. 3A.

FIG. 3A schematically shows a top view of an IC card for authentication according to a third embodiment, and FIG. 3B schematically shows a corresponding front view. The card comprises a body 300 and a first visual layer 320 including a natural material such as wood, leather, stone, etc., which is inlaid into a first portion of the body 300. The IC card further comprises means or a memory for storing a digital reference image, which is arranged in a second portion of the body 300.

According to this embodiment, the pattern of the natural material does not cover the entire area of the IC card but only a portion of the IC card. Scanning or taking a picture is performed on the first layer 320. The scanned image is compared with the digital reference image stored in the IC card 310 for the authentication. Various schemes of encryption can be used as explained in the previous embodiment.

Advantageously, the invention can enhance the security of an IC card using the naturally formed pattern of the natural material, such as wood, and storing the image of the pattern in advance as encrypted information in the IC card. The picture of the pattern is duplicated in a different scale and attached on a surface portion of the IC card for visual comparison between the image of the whole IC card and the picture attached at a portion of the IC card.

That which is claimed is:

1. An IC card comprising:
 a first visible layer comprising a nonmetallic natural material having a physical structure comprising a unique visual pattern, the nonmetallic natural material comprising stone;
 a storage device configured to store a reference image of the unique visual pattern to be visually compared with the unique visual pattern for authentication, with the reference image being a scan of the unique visual pattern;
 a transparent layer on a top surface of said first visible layer;
 a second layer on a bottom surface of said first visible layer, with the top surface being opposite the bottom surface; and
 said transparent layer, said first visible layer, and said second layer laminated together, and with each layer and the stone of the first visible layer having a same size to define a shape of the IC card.

2. The IC card according to claim 1, wherein said storage device comprises at least one of an IC chip, a bar code, a 2D code, a magnetic band and an optical band.

3. The IC card according to claim 1, wherein the reference image is encrypted from an image of the unique visual pattern.

4. The IC card according to claim 1, wherein the reference image is digitally signed from an image of the unique visual pattern.

5. The IC card according to claim 1, further comprising a picture of a portion of the unique visual pattern on a portion of said transparent layer.

6. The IC card according to claim 5, wherein said picture is a downscaled image of the portion of the unique visual pattern, said downscaled image comprising a physical area that is smaller than said portion of the unique visual pattern.

7. The IC card according to claim 5, wherein said picture comprises a monochrome picture that includes veining of the unique visual pattern.

8. The IC card according to claim 1, wherein said transparent layer comprises plastic.

9. A method of authenticating an IC card through an authentication apparatus, the IC card comprising
 a first visible layer comprising a nonmetallic natural material having a physical structure comprising a unique visual pattern,
 a storage device to store a reference image of the unique visual pattern,
 a second layer on a bottom surface of the first visible layer so as to support said first visible layer,
 a transparent layer on a top surface of the first visible layer, the top surface being opposite the bottom surface, wherein the transparent, first visible, and second layers are laminated together, and wherein each layer has a same size to define a shape of the IC card, and
 a third layer on a portion of the transparent layer, with the third layer comprising a picture of the unique visual pattern, the picture being an image of a portion of the unique visual pattern, wherein the image comprises a physical area that is smaller than the portion of the unique visual pattern, the method comprising:

reading the reference image with the authentication apparatus;
 scanning the unique visual pattern to generate a scanned image;
 comparing the reference image with the scanned image; and
 authenticating the IC card if the scanned image matches the reference image.

10. The method according to claim 9, further comprising displaying the reference image on a display of the authentication apparatus for visual authentication.

11. The method according to claim 9, wherein the transparent layer comprises plastic.

12. The method according to claim 9, wherein the picture comprises a monochrome picture that includes veining of the unique visual pattern.

13. The method according to claim 9, wherein the reference image is encrypted from an image of the unique visual pattern.

14. The method according to claim 9, wherein the reference image is digitally signed from an image of the unique visual pattern.

15. The method according to claim 9, wherein the nonmetallic natural material comprises wood.

16. The method according to claim 9, wherein the nonmetallic natural material comprises stone, and wherein the stone of the first visible layer has the same size to define the shape of the IC card.

17. The method according to claim 9, wherein the nonmetallic natural material comprises leather.

18. An IC card comprising:
 a visible first layer comprising a nonmetallic natural material having a physical structure comprising a unique visual pattern;
 a second layer laminated to a bottom surface of the visible first layer, the second layer configured to physically support the visible first layer;
 a transparent third layer laminated to a top surface of the visible first layer, the top surface being opposite the bottom surface;
 a fourth layer on a portion of the second layer or the transparent third layer, the fourth layer comprising a photograph of a portion of the unique visual pattern, the photograph being an image of the portion of the unique visual pattern, wherein the image comprises a physical area that is smaller than the portion of the unique visual pattern; and
 a storage device configured to store a reference image comprising a scan of the unique visual pattern, the reference image being configured to be compared with the unique visual pattern for authentication.

19. The IC card according to claim 18, wherein said transparent third layer comprises plastic.

20. The IC card according to claim 18, wherein said photograph comprises a monochrome picture that includes veining of the unique visual pattern.

21. The IC card according to claim 18, wherein the reference image is encrypted from an image of the unique visual pattern.

22. The IC card according to claim 18, wherein the reference image is digitally signed from an image of the unique visual pattern.

23. The IC card according to claim 18, wherein the nonmetallic natural material comprises wood.

* * * * *